United States Patent
Gladstone et al.

(10) Patent No.: US 6,531,960 B1
(45) Date of Patent: Mar. 11, 2003

(54) LOW TIRE PRESSURE INDICATOR

(75) Inventors: Peter Gladstone, 117 Eastern Ave., Arlington, MA (US) 02476; John Gundlach, Acton, MA (US); Hans-Georg Liemke, San Francisco, CA (US); Thomas C. Merle, Ashland, MA (US)

(73) Assignee: Peter Gladstone, Arlington, MA (US)

( * ) Notice: Subject to any disclaimer, the term of this patent is extended or adjusted under 35 U.S.C. 154(b) by 0 days.

(21) Appl. No.: 09/712,706

(22) Filed: Nov. 14, 2000

Related U.S. Application Data

(60) Provisional application No. 60/173,837, filed on Dec. 30, 1999.

(51) Int. Cl.$^7$ .............................................. B60C 23/00
(52) U.S. Cl. ...................... 340/442; 340/444; 340/447; 340/450; 73/146.8; 116/34 R
(58) Field of Search ................. 340/442, 444, 340/450, 447; 73/146.8, 715, 744; 116/34 R, 266, 270

(56) References Cited

U.S. PATENT DOCUMENTS

| | | | |
|---|---|---|---|
| 3,508,193 A | 4/1970 | Giovannelli et al. ........... 340/58 |
| 3,537,068 A | 10/1970 | Amundsen, Jr. .............. 340/58 |
| 3,670,688 A | 6/1972 | Seaberg ....................... 116/34 |
| 3,719,198 A | 3/1973 | Wilhelm et al. ............. 137/228 |
| 3,760,350 A | 9/1973 | Johnson ....................... 340/58 |
| 3,889,530 A | 6/1975 | Bluem ......................... 73/146.8 |
| 3,906,988 A | 9/1975 | Mottram ..................... 137/227 |
| 3,938,078 A | 2/1976 | Davis et al. .................. 340/58 |
| 3,994,312 A | 11/1976 | Tanner et al. ............... 137/226 |
| 3,999,431 A | 12/1976 | Makarainen ............... 73/146.5 |
| 4,072,048 A | 2/1978 | Arvan ....................... 73/146.8 |
| 4,103,549 A | 8/1978 | Schmidt ..................... 73/146.8 |
| 4,136,560 A | 1/1979 | Gellos ........................ 73/146.8 |
| 4,159,465 A | 6/1979 | Hatcher ....................... 340/58 |
| 4,362,121 A | 12/1982 | Pegram ..................... 116/34 R |
| 4,464,929 A | 8/1984 | Willis ........................ 73/146.8 |
| 4,606,391 A | 8/1986 | Achterholt ................. 152/431 |
| 4,819,686 A | * 4/1989 | Achterholt ................. 137/229 |
| 4,944,323 A | 7/1990 | Bartholomew et al. ..... 137/227 |
| 5,007,365 A | * 4/1991 | Hwang ..................... 116/34 R |
| 5,115,832 A | 5/1992 | Higdon et al. .............. 137/227 |
| 5,365,967 A | * 11/1994 | Moore ........................ 137/226 |
| 5,386,794 A | * 2/1995 | Foss et al. ................. 116/34 R |
| 5,569,849 A | * 10/1996 | Cummings ................. 73/146.8 |
| 5,641,902 A | 6/1997 | Hong ........................ 73/146.8 |
| 5,819,779 A | 10/1998 | Takemura et al. .......... 137/229 |
| 5,929,330 A | * 7/1999 | Ford ......................... 73/146.8 |

* cited by examiner

Primary Examiner—Daniel J. Wu
Assistant Examiner—Hung Nguyen
(74) Attorney, Agent, or Firm—Weingarten, Schurgin, Gagnebin & Lebovici LLP

(57) ABSTRACT

A tire pressure indication device is provided that continuously monitors pressure of a tire and instantaneously generates a visual display having an easy to read indication as soon as the tire pressure falls below a safe threshold limit. This device includes a dome shaped upper end. A two color dome shaped indicator element is disposed therein having two colors or other visually distinguishable markings which are visible through viewing areas. The dome element is rotatable in response to sensed tire pressure to provide a visual indication of low pressure and another visually distinct indication of safe pressure. The lower end of the body includes a connector to be fitted or threaded onto the valve stem of a tire. Multiple seals are provided within the device to substantially eliminate air or gas from escaping to the atmosphere. Thereby, the device can remain on the tire valve and monitor pressure for long periods of time.

10 Claims, 5 Drawing Sheets

LOW TIRE PRESSURE INDICATOR

CROSS REFERENCE TO RELATED APPLICATIONS

This application claims priority under 35 U.S.C. §119(e) to provisional patent application Ser. No. 60/173,837 filed Dec. 30, 1999, the disclosure of which is hereby incorporated by reference.

STATEMENT REGARDING FEDERALLY SPONSORED RESEARCH OR DEVELOPMENT

N/A

BACKGROUND OF THE INVENTION

This invention is directed to a low tire pressure indicator which is of simple and efficient construction and which can readily be installed on the valve stems of vehicle tires to provide a highly visible indication of tire pressure lower than a predetermined limit.

Proper maintenance of tire pressure is essential for optimizing the operation of a vehicle, as underinflation is the leading cause of tire failure. By maintaining the proper tire inflation, the life of the tire will be increased, the gas mileage of the vehicle will be improved, and the safety of the vehicle will be enhanced.

Tire failure is generally caused by overheating which typically results from one or a combination of tire defects, underinflation, or overloading. Tire heating is caused by the normal bending motion, or flex, in the sidewalls of a tire that occurs as a vehicle bounces up and down or moves side to side in turns. If the tires are properly inflated, the sidewalls will be stiff and the amount of flex will be minimized. However, if the tires are underinflated, they will become less stiff and the amount of flex will increase. Thereby, the tires will become more susceptible to overheating and failure.

The need for proper tire inflation has created a long time demand for various tire pressure devices. For instance, hand-held tire pressure gauges are well known and widely used. The user typically slides such a pressure gauge over the valve stem of the tire until the gauge sufficiently fits over the valve stem to create a seal that minimizes pressure escape between the tire and the gauge. Once the gauge has been appropriately positioned, the user notes the pressure value displayed on the gauge. The user then compares this value to the pressure value recommended by the manufacturer of the tire. The user must either refer to a manual or other source for this information or commit this value to memory.

Presently, all of the known tire pressure gauges either require a great deal of user intervention or do not provide a constant and instantaneous indication of whether the tire pressure has a value that is below a safe threshold limit. Most people seldom check tire pressure due to the inconvenience of these known gauges. Therefore, people fail to take an important role in preventing premature tire failure.

BRIEF SUMMARY OF THE INVENTION

The present invention is directed towards providing a tire pressure indication device that continuously monitors the tire pressure and instantaneously generates a visual display having an easy to read indication as soon as the tire pressure falls below a safe threshold limit. The device of the present invention includes a dome shaped upper end. A two color dome shaped indicator element is disposed therein having two colors or other visually distinguishable markings which are visible through viewing areas. The dome element is rotatable in response to sensed tire pressure to provide a visual indication of low pressure and a visually distinct indication of safe pressure. A low pressure indication is provided, for example, by having a visible color distinct from the color of the dome cover present in the viewing area while one continuous color is displayed when a safe pressure is sensed. The lower end of the body includes a fitting to be fitted or threaded onto the valve stem of a tire.

The tire pressure causes displacement of a piston within the indicator body, which cooperates with a camming mechanism, to cause rotation of the indicator dome for displaying first and second visual indicator markings. The indicator is calibrated such that the dome element rotates sufficiently to provide the visual indication of low pressure in the viewing areas when the pressure falls below the threshold limit. Pressure which is lower than normal but not as low as the threshold limit provides less rotation of the indicator dome and therefore displays decreased but not completely low pressure.

The device includes multiple seals to substantially eliminate air from escaping to the atmosphere. Thereby, the device may be left on the tire valve and monitor tire pressure for long periods of time. Furthermore, the rotational movement of the indicator dome can be provided in a non-linear manner by appropriate design of cammed surfaces on top of the piston such that the indicator dome quickly rotates to a warning position when the pressure is sufficiently low.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

Figure 1:
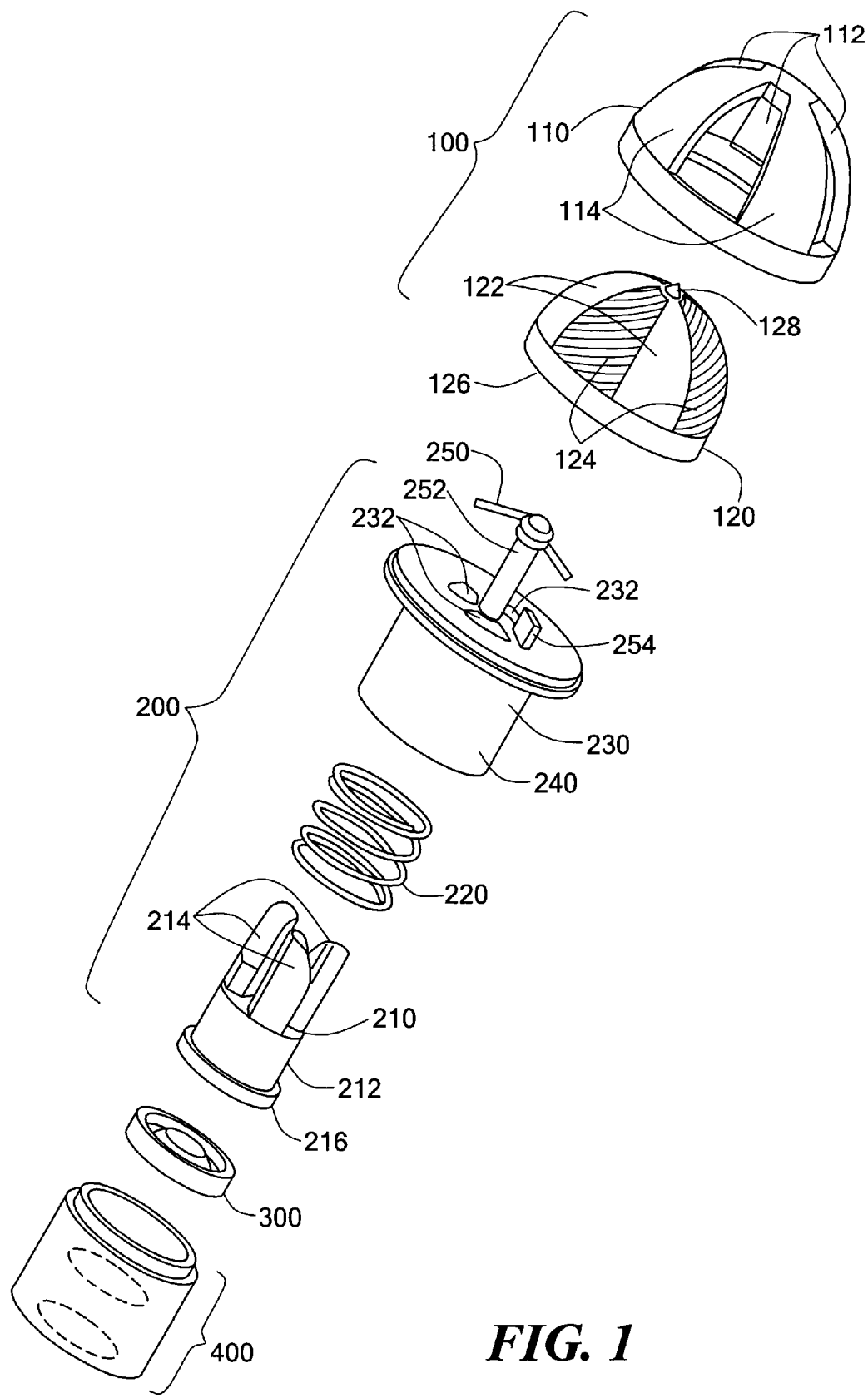
FIG. 1 is an exploded view of an embodiment of the present invention.

With reference to the drawings, a low tire pressure indicator according to an embodiment of the present invention will be described. Specifically, as shown in FIG. 1, the indicator includes an indicator dome 100, a cam mechanism 200, a seal 300, and a valve connector 400.

Figure 2:
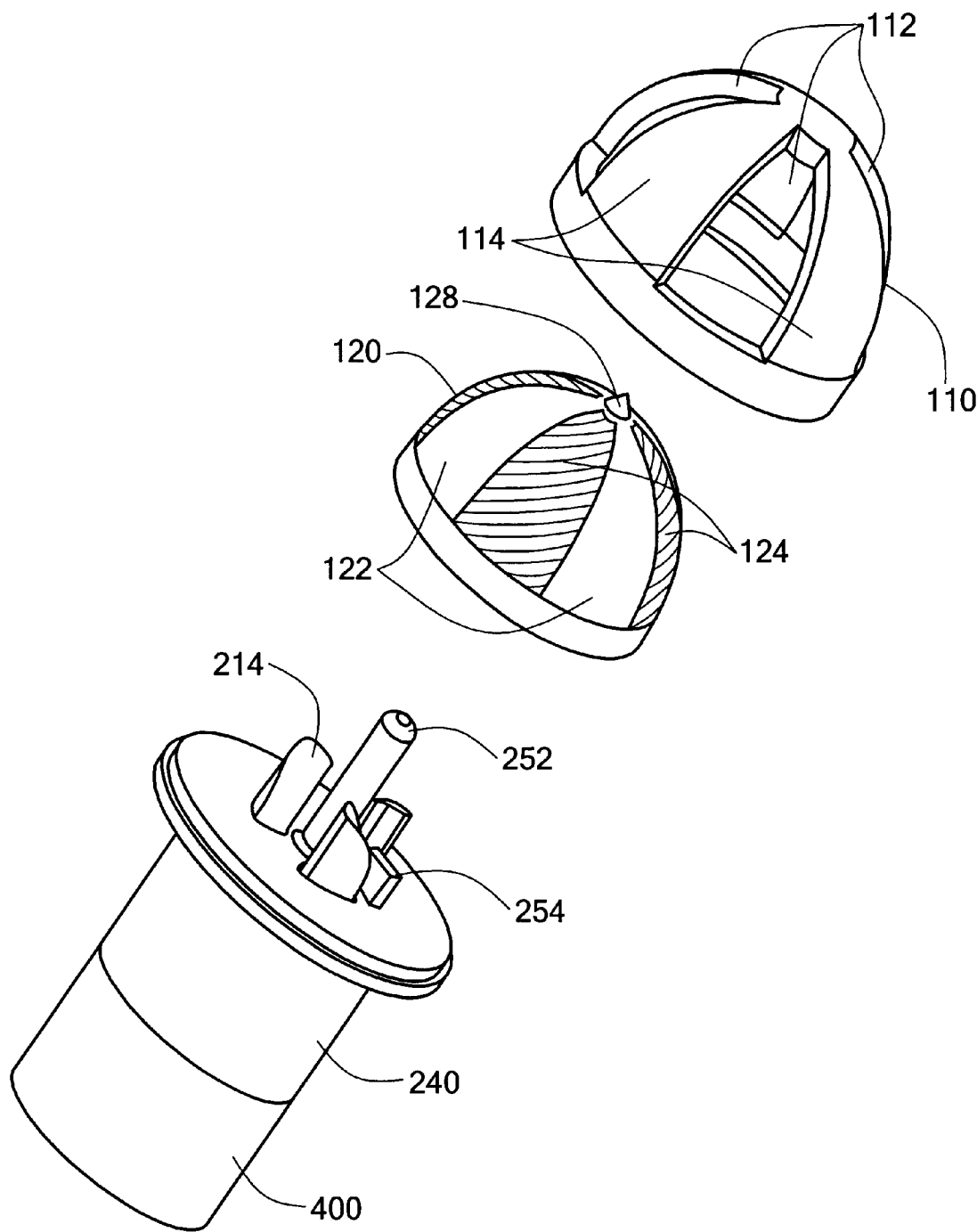
FIG. 2 is an exploded view illustrating the interaction between the cam mechanism and retainer in an embodiment of the present invention.
Figure 3:
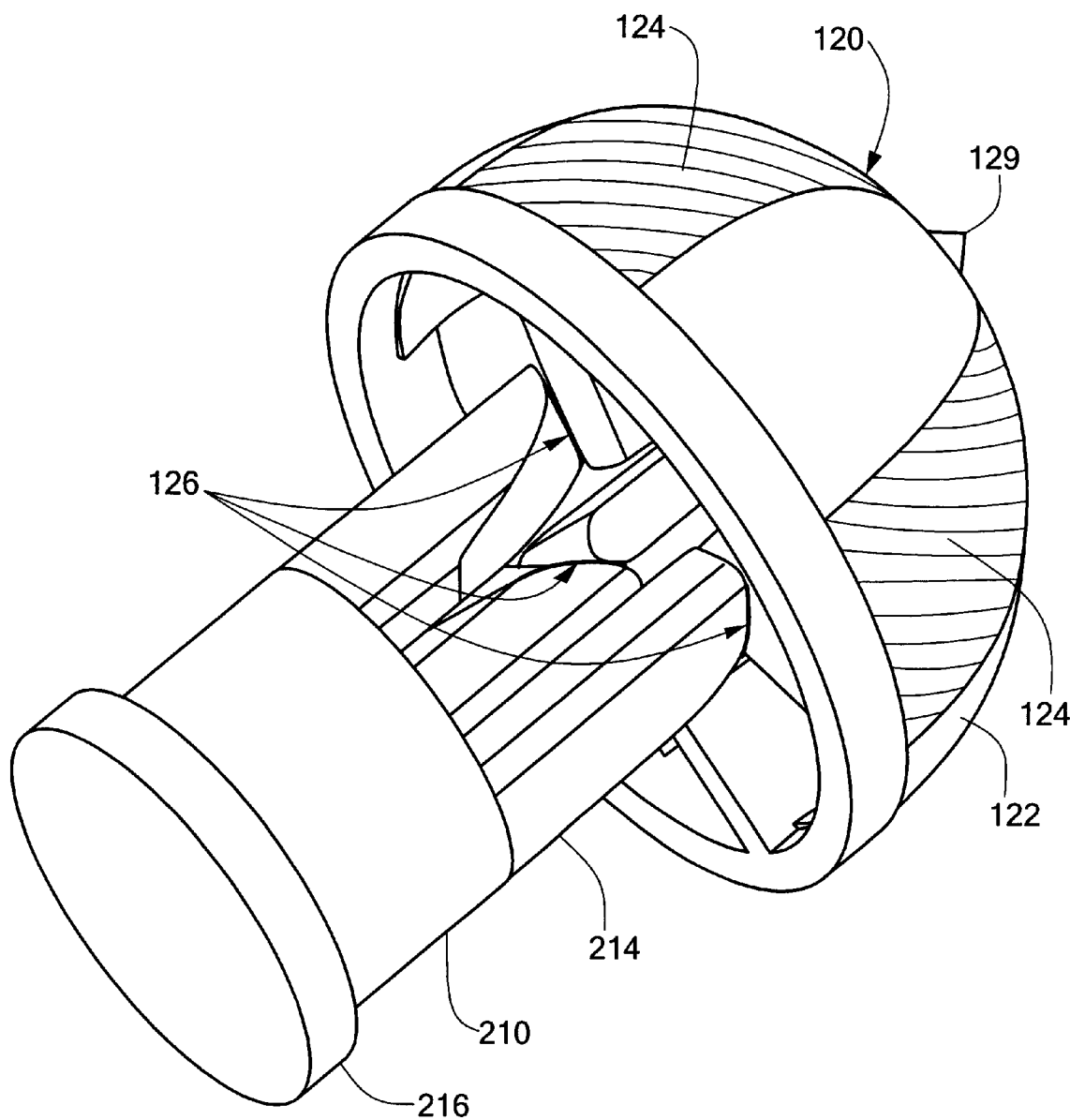
FIG. 3 illustrates the contact between the display dome and the cam mechanism in an embodiment of the present invention.

The indicator dome 100 includes a dome cover 110 that is directly connected to the cam mechanism 200. Viewing portions 112 and closed portions 114 are uniformly spaced around the surface of the dome cover 110. FIGS. 1–3 illustrate an embodiment of the present invention where the dome cover 110 includes four viewing portions 112 and four closed portions 114. The dome cover 110 is divided into eight equal areas in this embodiment so that the viewing portions 112 and closed portions 114 are uniformly spaced.

The dome cover 110 may preferably be a two color injection molded plastic. For example, the closed portions 114 may be made of a black plastic and the viewing portions 112 may be made of a clear plastic. It is readily apparent that many manufacturing techniques and color combinations may be used for the dome cover 110. However, the viewing portions 112 are preferably made of a clear plastic. This allows the dome cover 110 to be completely sealed while providing viewing areas for a low or warning pressure indication. By completely sealing the dome cover 110, the device elements will be protected from the environment and the device will be pressurized to prevent air from escaping out of the tire.

A dome display 120 is also included in the indicator dome 100. The dome display 120 is positioned within the dome cover 110 and is rotatably connected to the cam mechanism 200. The dome display 120 has alternating safe and warning indication portions 122 and 124 which correspond to the uniformly spaced viewing portions 112 and closed portions 114 of the dome cover 110. The safe indication portions 122 are used to indicate that the pressure is above a threshold limit and the warning indication portions 124 are used to indicate that the pressure is below the threshold limit. The two sets of alternating indication portions 122 and 124 may be distinguished by having one color for a set of indication portions and another color or visually distinguishable markings for the other set.

One embodiment of the present invention is illustrated in FIG. 1 where the dome display 120 is divided into eight equal areas to match the viewing portions 112 and closed portions 114 of the dome cover 110. For example, the safe indication portions 122 may be black and the warning indication portions 124 may be yellow. The safe indication portions 122 preferably match in color to the closed portions 114 of the dome cover 110 (black in this example) and the low pressure indication portions 124 have a different color or markings (such as yellow, orange, or another bright color or distinct markings) which visually contrasts from the color or markings on the closed portions 114.

Figure 4B:
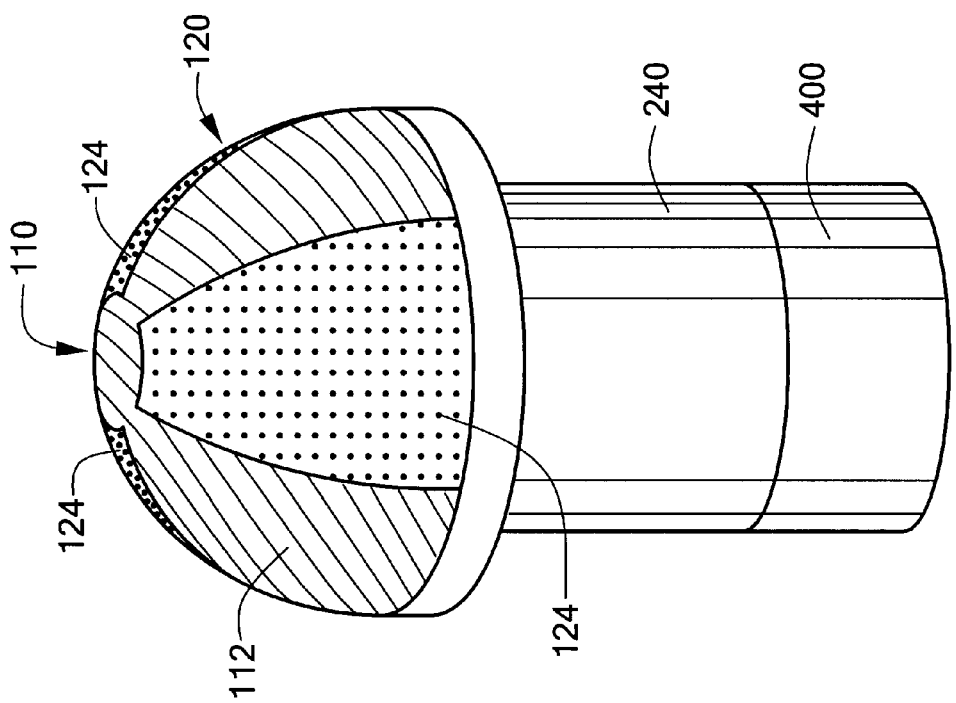
FIGS. 4(*a*) and 4(*b*) illustrate pressure indication conditions for an embodiment of the present invention.
Figure 4A:
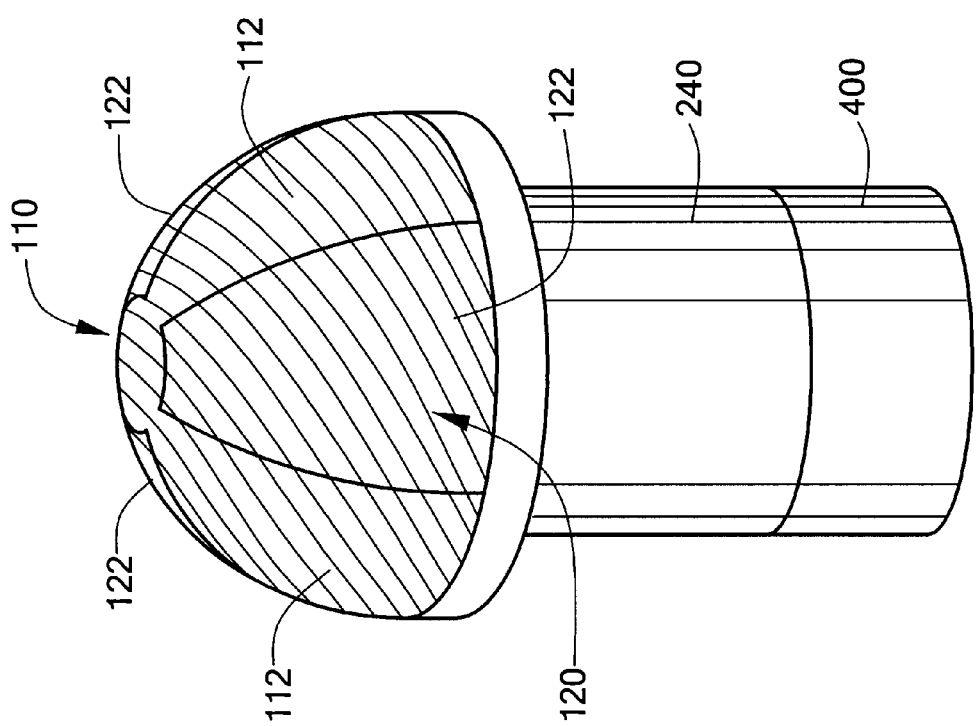

When the dome display 120 is in a safe pressure condition, the dome cover 110 and the dome display 120 will appear to be one continuous color as illustrated by the regions having a like shading in FIG. 4(a). If a low pressure condition is detected, the dome display 120 will then rotate so that the contrasting warning color or markings will be readily apparent from a quick visual glance as represented by the different cross hatched patterns on the dome cover 110 and the dotted patterns on the display dome 120 in FIG. 4(b). It is readily apparent that many manufacturing techniques and color combinations or markings may be used for the display dome 120. The display dome 120 is preferably made of a lightweight and durable material, such as plastic from a two color injection molding process.

The dome display 120 further includes ribs 126 for interacting with the cam mechanism 200 and rotating the dome display 120 as a change in pressure is detected. The ribs 126 may extend along an inside surface of the dome display 120 as illustrated in FIGS. 3 and 5. The ribs 126 and the cam mechanism 200 cooperatively engage to rotate the dome display 120. The shape of the top surface of the cam mechanism 200 which contacts the ribs 126 may be varied to achieve the desired nonlinear rotational displacement of the dome display 120. A guide 128 at the top center of the dome display 120 may also be included so that the dome display 120 will rotate freely and ensure proper orientation of the indication portions 122 and 124.

The cam mechanism 200 includes a piston 210, a linear spring 220, and a retainer 230. The piston 210 includes a base 212 having cam legs 214 extending up from its surface. The spring 220 fits outside of the base 212 and inside of the retainer 230 so that the linear spring 220 may expand and contract therebetween. The retainer 230 includes cam openings 232 on its top surface which correspond in number to the cam legs 214. The cam openings 232 should be designed to be slightly larger than the cam legs 214 for allowing the retainer 230 to slide freely about the axis of the cam legs 214. The surfaces of the cam legs 214 may then be exposed to engage with the dome display 120 and achieve the desired nonlinear rotational displacement. In the illustrative embodiment of FIG. 2, three cam legs 214 fit inside of three openings 232. However, it is apparent that various numbers of cam legs 214 and openings 232 may be used as long as they are corresponding in number.

The piston 210 also includes a circular neck 216 at its base 212 having a circumference larger than the circumference of the piston 210. Extending below the top surface of the retainer 230 is a cylindrical tube 240 for a distance greater than the length of the base 212. The inner circumference of the cylindrical tube 240 should only be slightly larger than the circumference of the neck 216. Thereby, the piston 210 may slide freely along the axis of the cam legs 212 with a minimal amount of wobble about this axis.

The linear spring 220 fits around the piston 210 and the neck 216 out from the base 212 to a sufficient distance for allowing the linear spring 220 to rest thereon. The cylindrical tube 240 is placed over the piston 210 and its neck 216 so that the inner surface of the cylindrical tube 240 fits snugly around the neck 216. The length of the cylindrical tube 240 extends down from the top surface of the retainer 230 to a sufficient distance for allowing the piston 210 to slide without becoming disengaged from the cylindrical tube 240. The linear spring 220 translates air pressure to linear displacement of the piston 210. The type of linear spring 220 is chosen and calibrated according to the pressure threshold that is to be detected and may be interchanged based on the desired pressure threshold.

The retainer 230 also includes a torsion spring 250 wrapped around a shaft 252. The shaft 252 extends up from the top surface of the retainer 230 and helps to properly position the dome display 120 in combination with the torsion spring 250. A torsion rib 254 may also be placed on the top surface of the retainer 230 for locking the torsion spring 250 in place. The dome display 120 is positioned on the shaft 252 so that it may rotate about the shaft 252.

Figure 5A:
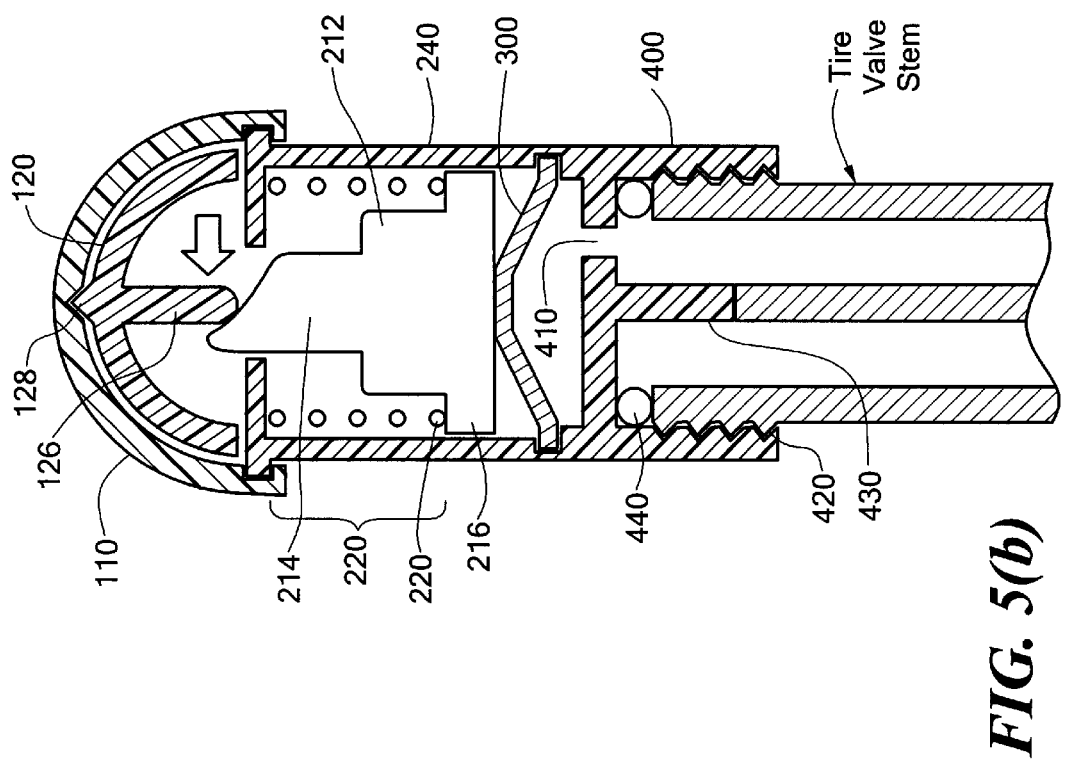
FIGS. 5(*a*) and 5(*b*) are cross sectional views illustrating safe and low pressure conditions for an embodiment of the present invention.
Figure 5B:
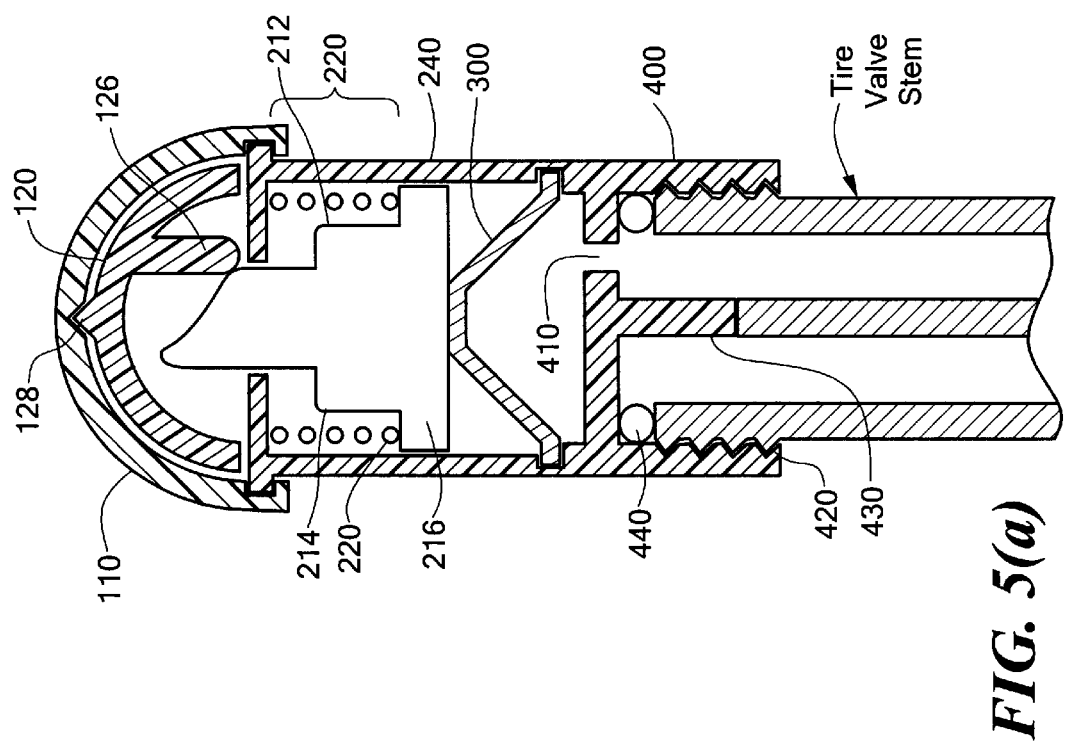

The dome cover 110 is carefully attached so that the safe and warning indication portions 122 and 124 of the dome display 120 line up with the viewing and closed portions 112 and 114. More specifically, when the pressure increases above the threshold limit and the piston 210 is forced upward as illustrated in FIG. 5(a), the dome cover 110 should be attached so that the safe indication portions 122 align with the viewing portions 112. Thereafter, as the pressure decreases, the warning indication portions 124 rotate toward and align with the viewing portions 112 as illustrated in FIG. 5(b).

The dome cover 110 is attached directly to the top surface of the retainer 230. Gluing, snapping, or other known attaching techniques may accomplish this attachment as long as a seal is maintained to prevent air or gas from escaping the device to the atmosphere. Again, the retainer 230 and the piston 210 are preferably made of a lightweight and durable material, such as plastic made for example in an injection molding process.

The device further includes the seal 300 and valve connector 400 as illustrated in FIGS. 1–3, and 5. The top surface of the valve connector 400 has a ledge 410 of a circumference slightly smaller than the circumference of the seal 300. The seal 300 is placed on top of the ledge 410 of the valve connector 400 and the bottom surface of the cylindrical tube 240. Then, the retainer 230 and the valve connector 400 may be attached in a known manner, such as gluing, snapping, or the like. The seal 300 is preferably a flexible membrane, such as an elastomer diaphragm seal and moves in response to the contacted pressure for actuating the piston 210. The seal 300 serves as part of the multiple seal structure to ensure that pressure from the valve does not escape to the atmosphere.

As illustrated in FIG. 5(a), when pressure flows through the valve connector 400 towards the seal 300, the seal 300 is forced upwards. This in turn forces the piston 210 upward which engages the cam legs 214 with the dome display 120 and displays the appropriate pressure indication in the viewing portions 112, such as the safe indication portions 122. FIG. 5(b) illustrates a decreased amount of pressure being exerted on the seal 300, which causes the height of the seal 300 to be reduced. The piston 210 is then forced downward which engages the cam legs 214 with the dome display 120 and displays the appropriate pressure indication in the viewing portions 112, such as the warning indication portions 122.

The valve connector 400 includes an opening 410 for allowing pressure to flow from the tire or source to the device. Additionally, the valve connector 400 includes threads 420 or another connecting structure for connecting the device to the valve of the tire. The valve connector 400 is preferably a chrome plated brass part. A stem 430 extends downward from the bottom surface of the valve connector 400 for depressing the valve core of the tire and thereby pressurizing the device. An O-ring seal 440 is preferably attached below the bottom surface of the valve connector 400 and above the threads 420 for maintaining a seal between the device and the valve of the tire. These multiple seals substantially eliminate any leakage from the valve to the atmosphere so that the device can remain attached to the valve for long periods of time.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

What is claimed is:

1. A tire pressure indicator comprising:
   a valve connector for connecting the tire pressure indicator to a tire;
   a cam mechanism having a body with a bottom surface coupled to said valve connector for sensing pressure from the tire and a piston disposed to slide axially within said body having a plurality of legs each terminating in a respective outer cam surface and said legs extending outward through openings in a top surface of said body; and
   an indicator having a cylindrical portion and a plurality of ribs extending inward from the cylindrical portion, each of the ribs contacting a respective outer cam surface;
   said indicator being rotatable in response to axial movement of said piston, said outer cam surfaces of said legs providing non-linear rotation of said indicator;
   said indicator having a visible display portion including a first visual indication when pressure from the tire is in a safe state equal to or above a predetermined safe threshold level and a second visual indication when pressure from the tire is in a warning state below said predetermined safe threshold level;
   said piston moving axially in response to tire pressure and operative to provide a non-linear rotational displacement of said indicator to trigger an abrupt transition from said first visual indication to said second visual indication in response to the tire pressure changing between said safe and warning states.

2. A tire pressure indicator according to claim 1, wherein said cam mechanism comprises a seal, a pressure spring, said piston, and a retainer.

3. A tire pressure indicator according to claim 2, wherein said seal comprises an elastomer diaphragm seal for axially displacing said piston by a deflection of said seal in response to pressure from the tire.

4. A tire pressure indicator according to claim 2, wherein each of said legs contact respective ones of said ribs for triggering said abrupt transition of said indicator from said first to said second visual indications in response to the tire pressure changing between said safe and warning states.

5. A tire pressure indicator according to claim 2, wherein said pressure spring comprises a linear spring that is calibrated for relating pressure from the tire to axial displacement of said piston.

6. A tire pressure indicator according to claim 2, wherein said piston, said retainer and said indicator comprise light weight plastic.

7. A tire pressure indicator according to claim 1, wherein said indicator comprises an indicator dome and an indicator cover.

8. A tire pressure indicator according to claim 7, wherein said indicator dome comprises a plurality of first visual indicator markings representing said first visual indication and a plurality of second indicator markings representing said second visual indication, said plurality of first and second visual indicator markings corresponding in number to each other.

9. A tire pressure indicator according to claim 8, wherein said indicator cover comprises a plurality of viewing areas for displaying said first and second indicator markings, said plurality of viewing areas corresponding in number to said plurality of first and second indicator markings.

10. A tire pressure indicator according to claim 9, wherein said indicator dome is triggered to provide said non-linear rotational displacement and said abrupt transition from said first to said second indicator markings being displayed through said viewing areas in response to pressure from the tire sensed by said cam mechanism changing from said safe to said warning states.

* * * * *